No. 680,244. Patented Aug. 13, 1901.
G. S. GREEN.
BACK PEDALING BRAKE.
(Application filed Dec. 19, 1900.)
(No Model.)
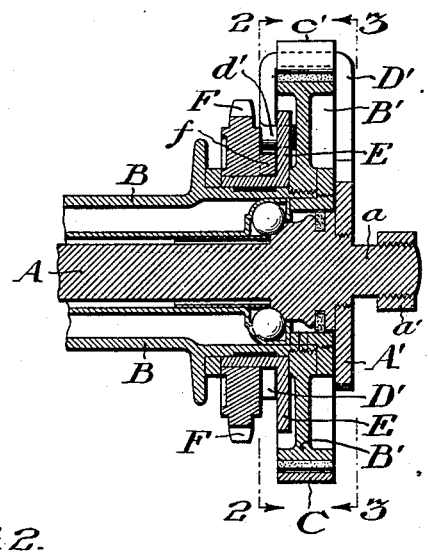
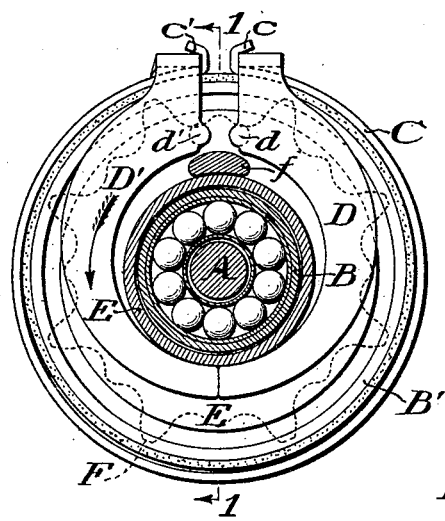
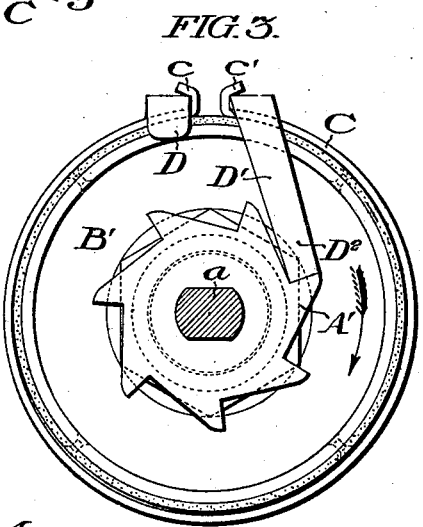
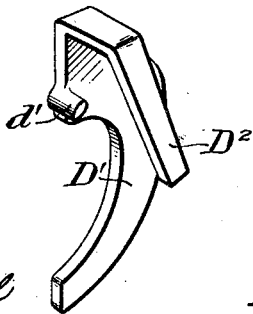
WITNESSES:
Clifton C. Hallowell
John C. Bergner.
INVENTOR:
GEORGE S. GREEN,
by Arthur E. Paige
Atty.

UNITED STATES PATENT OFFICE.

GEORGE S. GREEN, OF PHILADELPHIA, PENNSYLVANIA.

BACK-PEDALING BRAKE.

SPECIFICATION forming part of Letters Patent No. 680,244, dated August 13, 1901.

Application filed December 19, 1900. Serial No. 40,383. (No model.)

*To all whom it may concern:*

Be it known that I, GEORGE S. GREEN, of Philadelphia, in the State of Pennsylvania, have invented certain new and useful Improvements in Back-Pedaling Brakes, whereof the following is a specification, reference being had to the accompanying drawings.

My invention relates particularly to that class of devices adapted for embodiment in connection with a vehicle-wheel; and my invention consists of the combination of elements whereby the vehicle-wheel may be positively driven, may be freed for idle rotation or coasting, or may be braked to prevent its rotation at the will of the operator, as hereinafter more definitely specified and claimed.

In the accompanying drawings, Figure 1 is a fragmentary sectional view showing a convenient form of my invention applied to a wheel-hub mounted to rotate upon a non-rotatable axle. Fig. 2 is a sectional view taken on the line 2 2 in Fig. 1. Fig. 3 is a sectional view taken on the line 3 3 in Fig. 1. Fig. 4 is a perspective view of the clamp-lever indicated at the right-hand side of Fig. 3.

In said figures, A is the non-rotatable axle of a vehicle-wheel, such as the rear wheel of a bicycle. Said axle is secured in non-rotatable relation with the wheel-frame by the engagement of its flattened shoulder $a$ in the opening in the frame and by the pressure of the nut $a'$ against the side thereof.

B is the wheel-hub, which is to be positively driven, allowed to run free, or prevented from rotating in accordance with the three positions of which my device is capable. Said hub B comprises a drum-flange B', upon which is mounted the clamp-band C, whose opposite extremities $c$ $c'$ are respectively engaged by levers D D'. Said levers are fulcrumed, respectively, at $d$ $d'$ in the sleeve E, which is mounted to rotate loosely upon the hub B. Said sleeve E serves as a bearing for the driving-wheel F, which is adapted to receive an ordinary sprocket-chain and is provided with the lug $f$, which projects in position to engage the levers D D', as best shown in Fig. 2.

In the several figures the parts are shown in the position for coasting, wherein the band C is relaxed and the hub B, together with its flange B', are permitted to rotate idly within the band without rotation of the driving-wheel F. In said position of the parts the band C and sleeve E are maintained in stationary relation with respect to the axle A by the engagement of the pawl end $D^2$ of the lever D' in a tooth of the ratchet A', fixed upon the non-rotatable axle A.

The operation of the device is as follows: The parts being in the coasting position shown and it being desired to positively rotate the hub B by rotation of the driving-wheel F in the direction of the arrow shown upon Fig. 2, the initial movement of said driving-wheel F in the direction indicated serves to wedge the lug $f$ between the sleeve E and the inner extremity of the lever D', and thereby swing the latter outwardly. Said outward movement of the lever D' serves to disengage its pawl extremity $D^2$ from the ratchet A' and simultaneously clamp the band C upon the periphery of the flange B', so that by the further rotation of the driving-wheel F the hub B is positively driven in the direction of the arrow aforesaid, the brake-band C, levers D D', and sleeve E being of course rotated therewith. Said clamping of the parts is effected by approximately one-quarter revolution of the driving-wheel F, and the parts may be restored to the normal idle position shown by reverse rotation of the driving-wheel F to the same extent. Said reverse rotation of the driving-wheel F in one direction not only brings its lug $f$ to the intermediate position, (shown in Fig. 2,) but also restores the pawl $D^2$ to engagement with the non-rotatable ratchet A', and further reverse rotation of said lug $f$ wedges the latter between the sleeve E and the inner extremity of the clamp-lever D, thereby contracting the band C upon the periphery of the flange B'. It is to be understood that in accordance with the extent of the traverse of the lug $f$ in contact with the lever D the rotation of the hub B may be slightly retarded or absolutely prevented, the pawl $D^2$ of course rendering the band C a fixture with respect to the framework of the vehicle during the braking operation of the device. In order to insure the instantaneous disengagement of the band C from the flange B', I prefer to make said band resilient.

In the several figures I have shown the ball-bearing connection between the axle A and the hub B. It is to be understood, however, that the details thereof form no part of my present invention. Moreover, it is to be understood that I do not desire to limit myself to the precise details of construction which I have shown and described, as it is obvious that various modifications may be made therein without departing from the essential features of my invention.

I claim—

1. In a back-pedaling brake, the combination with a hub and axle; of a clamp-band fitted to said hub; a driving-wheel mounted to rotate upon said hub; means arranged to clamp said band upon said hub by rotation of said driving-wheel in either direction; and means to respectively prevent and permit the rotary traverse of said band in accordance with the movement of said driving-wheel in one direction or the other, substantially as set forth.

2. In a back-pedaling brake, the combination with a hub and axle; of a clamp-band fitted to said hub and normally relaxed thereon; a driving-wheel mounted to rotate upon said hub; opposed levers arranged to respectively clamp said band upon said hub when said driving-wheel is rotated in either direction; a non-rotatable ratchet; and a pawl fixed to one of said levers, arranged to engage or disengage said ratchet in accordance with the movement of said driving-wheel in one direction or the other, substantially as set forth.

3. In a back-pedaling brake, the combination with a hub and axle; of a clamp-band fitted to said hub and normally relaxed thereon; a sleeve mounted to rotate upon said hub; opposed levers fulcrumed in said sleeve, and respectively engaged at their outer ends with the opposite extremities of said band; a driving-wheel mounted to rotate upon said sleeve; a lug upon said driving-wheel arranged to actuate one or the other of said levers, when said driving-wheel is rotated in either direction; a non-rotatable ratchet; and a pawl fixed to one of said levers arranged to engage or disengage said ratchet in accordance with the movement of said driving-wheel in one direction or the other, substantially as set forth.

GEORGE S. GREEN.

Witnesses:
ARTHUR E. PAIGE,
E. L. FULLERTON.